United States Patent
Zhao et al.

(10) Patent No.: US 10,935,178 B2
(45) Date of Patent: Mar. 2, 2021

(54) GIMBAL LOAD MOUNTING ASSEMBLY, GIMBAL, AND IMAGING DEVICE

(71) Applicant: SZ DJI OSMO TECHNOLOGY CO., LTD., Shenzhen (CN)

(72) Inventors: Yanchong Zhao, Shenzhen (CN); Weidong Li, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/453,634

(22) Filed: Jun. 26, 2019

(65) Prior Publication Data

US 2019/0316731 A1 Oct. 17, 2019

Related U.S. Application Data

(63) Continuation of application No. PCT/CN2016/112790, filed on Dec. 28, 2016.

(51) Int. Cl.
*F16M 11/18* (2006.01)
*F16M 11/04* (2006.01)
(Continued)

(52) U.S. Cl.
CPC ........... *F16M 11/18* (2013.01); *F16M 11/045* (2013.01); *F16M 11/048* (2013.01);
(Continued)

(58) Field of Classification Search
CPC ........ G03B 17/56; F16M 11/04; F16M 11/12; F16M 11/10; F16M 11/18
(Continued)

(56) References Cited

U.S. PATENT DOCUMENTS

| 7,124,656 B2 * | 10/2006 | Miller ................... F16M 11/08 74/5.1 |
| 8,874,283 B1 | 10/2014 | Cavote |

(Continued)

FOREIGN PATENT DOCUMENTS

| CN | 201413446 Y | 2/2010 |
| CN | 201507528 U | 6/2010 |

(Continued)

OTHER PUBLICATIONS

World Intellectual Property Organization (WIPO) International Search Report for PCT/CN2016/112790 dated Oct. 10, 2017 8 Pages.

*Primary Examiner* — Clayton E. LaBalle
*Assistant Examiner* — Kevin C Butler
(74) *Attorney, Agent, or Firm* — Anova Law Group, PLLC

(57) ABSTRACT

A gimbal load mounting assembly includes a first seating body. The gimbal load mounting assembly also includes a second seating body configured to slidably connect with the first seating body. The gimbal load mounting assembly also includes an adjustment device. The first seating body is configured to be connected with a supporting frame of a gimbal and is slidable in a first direction. The second seating body is configured to mount a load, and is slidable along the first seating body in a second direction. The adjustment device is provided on one of the first seating body and the second seating body, and is configured to drive the other one of the first seating body and the second seating body to move to adjust relative positions between the first seating body and the second seating body.

19 Claims, 4 Drawing Sheets

(51) Int. Cl.
*F16M 11/12* (2006.01)
*G03B 17/56* (2006.01)
*F16M 13/04* (2006.01)

(52) U.S. Cl.
CPC ......... *F16M 11/123* (2013.01); *G03B 17/561* (2013.01); *F16M 13/04* (2013.01); *F16M 2200/027* (2013.01)

(58) Field of Classification Search
USPC ........................................................ 396/428
See application file for complete search history.

(56) References Cited

U.S. PATENT DOCUMENTS

| | | | | |
|---|---|---|---|---|
| 2010/0158499 | A1* | 6/2010 | Kendall | G03B 17/00 396/428 |
| 2014/0267805 | A1* | 9/2014 | Webb | H04N 5/23258 348/208.2 |
| 2017/0078538 | A1* | 3/2017 | Zhu | H04N 5/2253 |
| 2017/0099416 | A1* | 4/2017 | Pan | F16M 11/123 |
| 2017/0108161 | A1* | 4/2017 | Zhao | G03B 17/561 |
| 2017/0108761 | A1* | 4/2017 | Pan | F16M 13/04 |
| 2017/0131623 | A1* | 5/2017 | Zhou | F16M 11/205 |
| 2017/0174362 | A1* | 6/2017 | Zhao | G03B 15/006 |
| 2018/0319512 | A1* | 11/2018 | Kang | B64D 47/08 |
| 2018/0335178 | A1* | 11/2018 | Bin | F16M 11/38 |
| 2019/0301664 | A1* | 10/2019 | Zhao | F16M 11/205 |
| 2019/0302578 | A1* | 10/2019 | Zhao | F16M 11/205 |
| 2019/0316731 | A1* | 10/2019 | Zhao | F16M 11/24 |
| 2019/0317386 | A1* | 10/2019 | Zhao | F16M 11/04 |

FOREIGN PATENT DOCUMENTS

| | | | | |
|---|---|---|---|---|
| CN | 202469393 | U | 10/2012 | |
| CN | 202720439 | U | 2/2013 | |
| CN | 203868620 | U | 10/2014 | |
| CN | 204005820 | U | 12/2014 | |
| CN | 204062364 | | * 12/2014 | ............ F16M 11/12 |
| CN | 204062364 | U | 12/2014 | |
| CN | 204437591 | | * 7/2015 | ............ F16M 11/04 |
| CN | 104981644 | | * 10/2015 | ............ F16M 11/04 |
| CN | 104981644 | A | 10/2015 | |
| CN | 205076055 | U | 3/2016 | |
| CN | 205396566 | | * 7/2016 | ............ B64D 47/08 |
| CN | 205396566 | U | 7/2016 | |
| CN | 206361366 | U | 7/2017 | |
| CN | 107110417 | A | 8/2017 | |
| CN | 107110418 | | * 8/2017 | ............ F16M 11/12 |
| CN | 107110418 | A | 8/2017 | |

* cited by examiner

GIMBAL LOAD MOUNTING ASSEMBLY, GIMBAL, AND IMAGING DEVICE

CROSS-REFERENCE TO RELATED APPLICATION

This application is a continuation application of International Application No. PCT/CN2016/112790, filed on Dec. 28, 2016, the entire content of which is incorporated herein by reference.

TECHNICAL FIELD

The present disclosure relates to the technology field of photography and, more particularly, to a gimbal load mounting assembly, a gimbal having the gimbal load mounting assembly, and an imaging device.

BACKGROUND

When devices for obtaining external information, such as cameras, camcorders, or sensors, are mounted to a gimbal, the gimbal can stabilize these loads. Using the camera as an example of the load, the gimbal may enable the camera to perform photographing stably and to adjust a photographing angle. The gimbal may cause the camera to move in at least one rotation direction. The gimbal may include a driving motor for causing the camera to rotate in the at least one rotation direction. When being connected to the gimbal, the center of gravity of the camera needs to be located on a rotating shaft in the at least one rotation direction, so as to avoid unexpected torque exerted on the driving motor, which may affect the user experience of photographing and the operation life of the gimbal. As such, it become important to provide a capability of quickly adjusting the center of gravity of the camera relative to the gimbal.

SUMMARY

In accordance with an aspect of the present disclosure, there is provided a gimbal load mounting assembly includes a first seating body. The gimbal load mounting assembly also includes a second seating body configured to slidably connect with the first seating body. The gimbal load mounting assembly also includes an adjustment device. The first seating body is configured to be connected with a supporting frame of a gimbal and is slidable in a first direction. The second seating body is configured to mount a load, and is slidable along the first seating body in a second direction. The adjustment device is provided on one of the first seating body and the second seating body, and is configured to drive the other one of the first seating body and the second seating body to move to adjust relative positions between the first seating body and the second seating body.

In accordance with another aspect of the present disclosure, there is also provided a gimbal. The gimbal includes a supporting frame, a motor assembly configured to drive the supporting frame to rotate, and a gimbal load mounting assembly mounted to the supporting frame. The gimbal load mounting assembly includes a first seating body and a second seating body configured to slidably connect with the first seating body. The gimbal load mounting assembly also includes an adjustment device. The first seating body is configured to connect with the supporting frame of the gimbal and is slidable in a first direction. The second seating body is configured to mount a load, and is slidable along the first seating body in a second direction. The adjustment device is provided on one of the first seating body and the second seating body, and is configured to drive the other one of the first seating body and the second seating body to move to adjust relative positions between the first seating body and the second seating body.

In accordance with another aspect of the present disclosure, there is also provided an imaging device. The imaging device includes a gimbal and a photographing assembly mounted to the gimbal. The gimbal includes a supporting frame and a gimbal load mounting assembly. The gimbal load mounting assembly includes a first seating body and a second seating body configured to slidably connect with the first seating body. The gimbal load mounting assembly also includes an adjustment device. The first seating body is configured to connect with the supporting frame and is slidable in a first direction. The second seating body is configured to mount the photographing assembly, and is slidable along the first seating body in a second direction. The adjustment device is provided on one of the first seating body and the second seating body, and is configured to drive the other one of the first seating body and the second seating body to move to adjust relative positions between the first seating body and the second seating body.

According to the present disclosure, as compared with the existing technologies, the disclosed gimbal load mounting assembly includes a first seating body and a second seating body that can slide relative to one another, and an adjustment device configured to drive the first seating body or the second seating body to slide relative to one another, thereby achieving the goal of quickly and conveniently adjusting the mounting location of the load.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

ELEMENTS LIST

Figure 1:
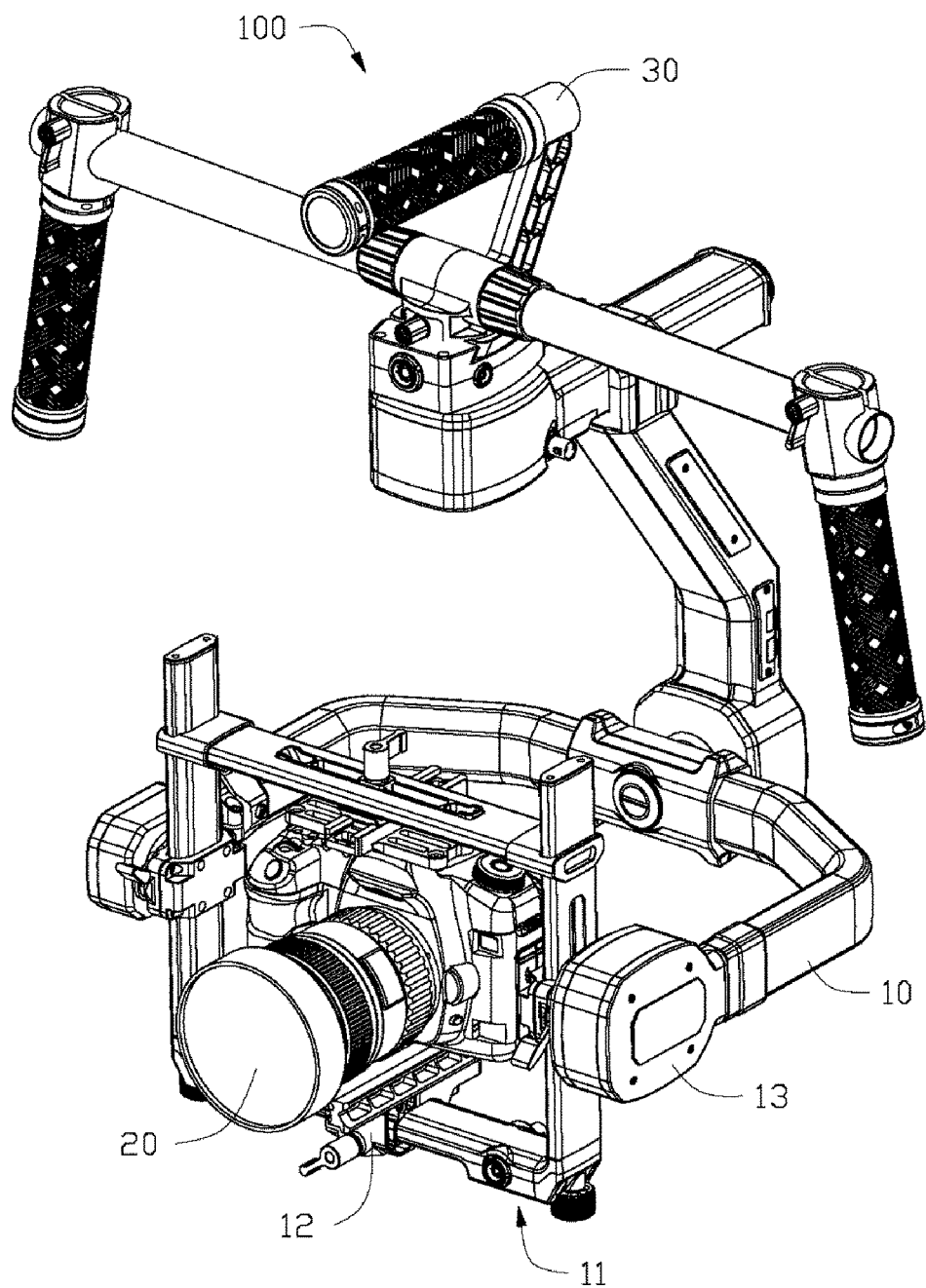
FIG. 1 is a perspective view of an imaging device, according to an example embodiment.
Figure 2:
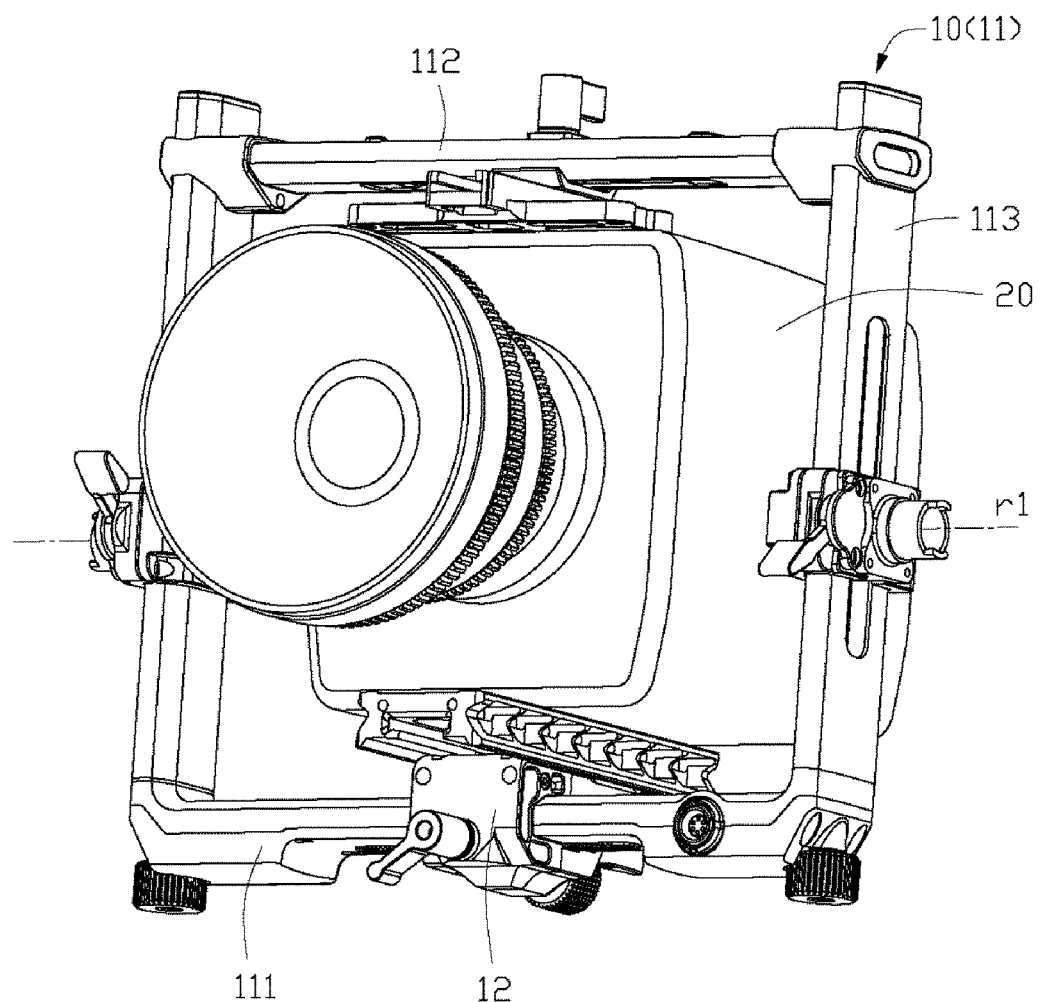
FIG. 2 is a perspective view of the imaging device of FIG. 1 with a handheld structure removed, according to an example embodiment.
Figure 3:
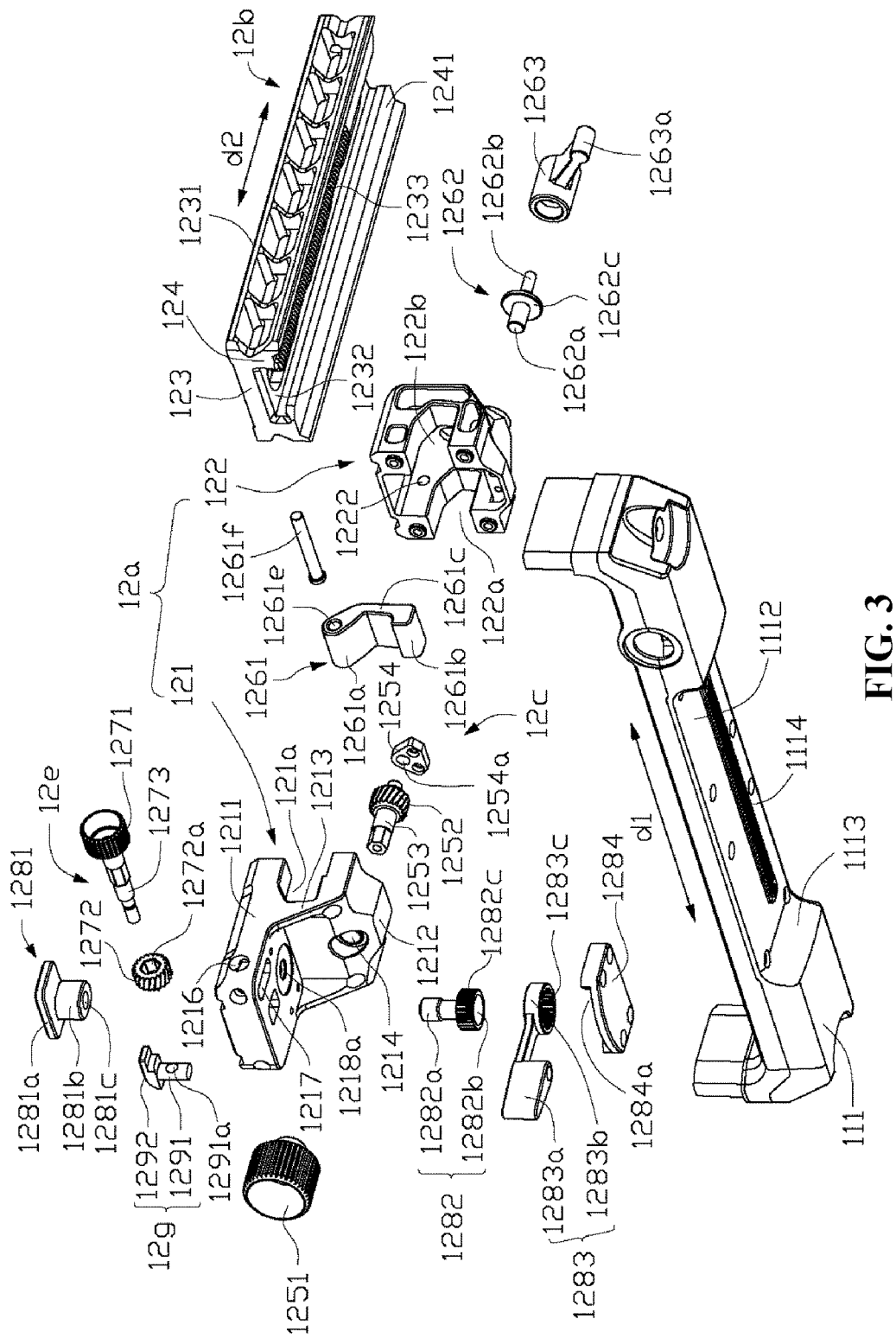
FIG. 3 is an exploded view of a gimbal load mounting assembly of the imaging device of FIG. 1, according to an example embodiment.
Figure 4:
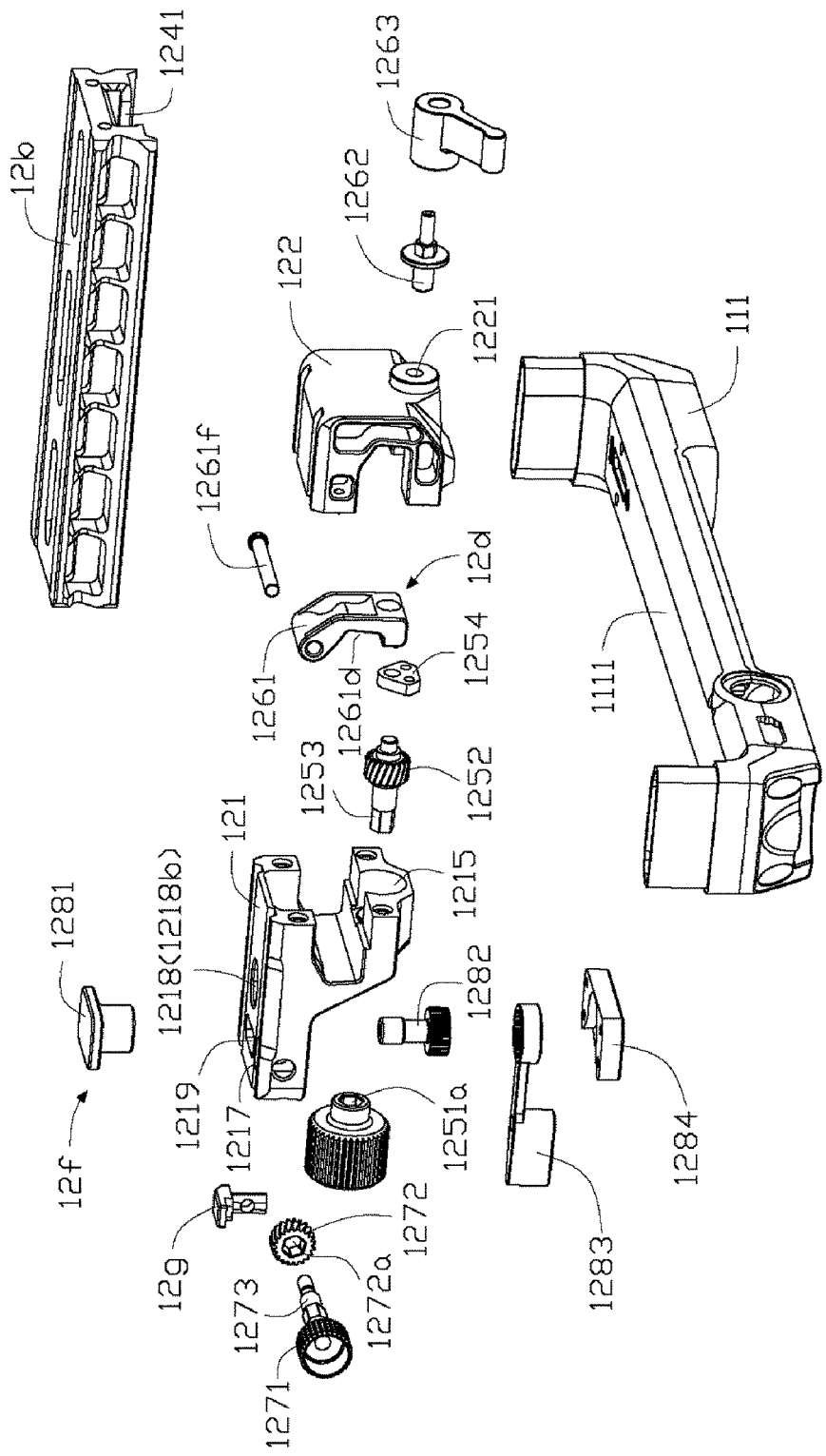
FIG. 4 is an exploded view of the gimbal load mounting assembly of FIG. 3 from another perspective, according to an example embodiment.

Imaging device 100
Gimbal 10
Supporting frame 11
First horizontal frame 111
Guiding member 1111
Groove 1112
Blocking wall 1113
Rack 1114
Second horizontal frame 112
Vertical frame 113

Mounting assembly 12
First seating body 12a
First matching member 121
First groove 121a
First mounting member 1211
Second mounting member 1212
Connecting member 1213
First through hole 1214
First adapting groove 1215
Second through hole 1216
Second adapting groove 1217
First assembly hole 1218
First hole portion 1218a
Second hole portion 1218b
Mounting hole 1219
Second matching member 122
Second groove 122a
Receiving groove 122b
Second assembly hole 1221
Insertion hole 1222
Second seating body 12b
Mounting panel 123
Top surface 1231
Bottom surface 1232
Rack 1233
Side panel 124
Guiding rail 1241
First adjustment device 12c
First knob 1251
Insertion hole 1251a
First driving member 1252
Rotating shaft 1253
Bearing 1254
Shaft hole 1254a
First fastener 12d
First abutting portion 1261
First end portion 1261a
Second end portion 1261b
Abutting member 1261c
Matching groove 1261d
Shaft hole 1261e
Rotating shaft 1261f
First driving portion 1262
Stud section 1262a
Connecting section 1262b
Positioning member 1262c
First handle 1263
Handle member 1263a
Second adjustment device 12e
Second knob 1271
Second driving member 1272
Through hole 1272a
Rotating shaft 1273
Second fastener 12f
Second abutting portion 1281
Pressing panel 1281a
Connecting column 1281b
Connecting hole 1281c
Second driving portion 1282
Stud 1282a
Nut 1282b
Protruding rib 1282c
Second handle 1283
Sleeve fitting member 1283a
Handle member 1283b
Groove 1283c
Cover 1284
Opening 1284a
Position limiting member 12g
Fixed part 1291
Through hole 1291a
Snap-fit part 1292
Load 20
Handheld structure 30

The detailed embodiments of the present disclosure will be described with reference to the drawings.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless.

When a first component is referred to as "disposed," "located," or "provided" on a second component, the first component may be directly disposed, located, or provided on the second component or may be indirectly disposed, located, or provided on the second component via an intermediate component. The term "on" does not necessarily mean that the first component is located higher than the second component. In some situations, the first component may be located higher than the second component. In some situations, the first component may be disposed, located, or provided on the second component, and located lower than the second component. In addition, when the first item is disposed, located, or provided "on" the second component, the term "on" does not necessarily imply that the first component is fixed to the second component. The connection between the first component and the second component may be any suitable form, such as secured connection (fixed connection) or movable contact.

When a first component is referred to as "disposed," "located," or "provided" in a second component, the first component may be partially or entirely disposed, located, or provided in, inside, or within the second component. When a first component is coupled, secured, fixed, or mounted "to" a second component, the first component may be is coupled, secured, fixed, or mounted to the second component from any suitable directions, such as from above the second component, from below the second component, from the left side of the second component, or from the right side of the second component.

The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure.

In addition, the singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

FIG. 1 to FIG. 4 show an imaging device 100. The imaging device 100 may include a gimbal 10 and a load 20 carried by the gimbal 10 (or mounted to the gimbal 10). The gimbal 10 may be configured to stabilize the load 20 and change the facing direction or angle of the load 20. In some embodiments, the load 20 may be a photographing assembly including a camera configured to capture a video and/or an image. In some embodiments, the camera may include one or more of a single-lens-reflex ("SLR") camera, a camcorder, a card camera, a surveillance camera, or other electronic device equipped with a camera function (e.g., cell phone, tablet, etc.).

In some embodiments, the gimbal 10 may be any of a tri-axis gimbal, a dual-axis gimbal, or a single-axis gimbal.

In some embodiments, the gimbal 10 is a tri-axis gimbal. The gimbal 10 may include a supporting frame and a motor assembly including an electric motor (not shown) configured to drive the supporting frame to rotate. The supporting frame may be configured to carry the load 20 and may be driven by the electric motor to rotate, thereby causing the load 20 to rotate around an axis of the gimbal 10. For different axes of the gimbal, the number of the electric motor(s) and the number of the supporting frame(s) may be different. FIG. 1 only shows a portion of the structure of the gimbal 10. The gimbal 10 may include a supporting frame 11 and a mounting assembly 12 (or gimbal load mounting assembly 12) provided on the supporting frame 11. In some embodiments, the supporting frame 11 may carry the load 20 through the mounting assembly 12, and may be driven by the electric motor 13 to rotate around an axis. In the embodiment shown in FIG. 1-FIG. 4, the supporting frame 11 may rotate around an axis r1. The axis r1 may be a pitch axis of the gimbal 10. In some embodiments, the gimbal 10 may include other frames (not shown) that can rotate around other axes (e.g., a roll axis, a yaw axis) of the gimbal 10, and other electric motors configured to drive the supporting frame to rotate.

In some embodiments, the gimbal 10 may be connected with a handheld structure 30. The imaging device 100 may be a handheld imaging device. In some embodiments, the gimbal 10 may be connected with a movable object (e.g., an unmanned aerial vehicle, an unmanned ground vehicle, etc.) to form a movable imaging device (e.g., aerial photographing device, ground based movable photographing device).

In some embodiments, the supporting frame 11 may have a substantially rectangular frame shape, and may include a first horizontal frame 111, a second horizontal frame 112, and two vertical frames 113. The first horizontal frame 111 may be disposed substantially parallel with the second horizontal frame 112. The two vertical frames 113 may be disposed substantially in parallel with each other. The first horizontal frame 111 and the second horizontal frame 112 may be substantially perpendicular to the two vertical frames 113.

In some embodiments, when the imaging device 100 is placed in a normal state, the first horizontal frame 111 is located at a lower portion (i.e., closer to the ground) and the second horizontal frame 112 is located at an upper portion (i.e., farther away from the ground).

In some embodiments, the first horizontal frame 111 may have a substantially strip shape. The first horizontal frame 111 may include a guiding member 1111. The guiding member 1111 may fit with the mounting assembly 12 and may guide the movement of the mounting assembly 12. In some embodiments, the first horizontal frame 111 may include a groove 1112 disposed at a bottom portion of the guiding member 1111. The first horizontal frame 111 may include a blocking wall 1113 formed at two ends of the groove 1112. The blocking wall 1113 may be configured to limit the movement of the mounting assembly 12 relative to the first horizontal frame 111.

In some embodiments, the guiding member 1111 may include a rack 1114. The length direction of the rack 1114 may be substantially parallel with the length direction of the guiding member 1111. In some embodiments, the teeth of the rack 1114 are disposed in a slanted fashion (e.g., forming a predetermined angle) relative to the length direction of the rack 1114. The rack 1114 may be integrally formed with the guiding member 1111, or may be fixedly connected with the guiding member 1111 after being individually formed.

In some embodiments, the mounting assembly 12 may include a first seating body 12a, a second seating body 12b, a first adjustment device 12c, a first fastener 12d, a second adjustment device 12e, a second fastener 12f, and a position limiting member 12g. The first seating body 12a may be provided on the first horizontal frame 111, and may be slidable along a first direction d1 on the first horizontal frame 111. The second seating body 12b may be provided on the first seating body 12a and may be slidable in the second direction d2 along the first seating body 12a. The first direction d1 and the second direction d2 are different, and may cross each other at a predetermined angle. In some embodiments, the first direction d1 may be substantially perpendicular to the second direction d2. In the embodiment shown in FIG. 3, the first direction d1 may be substantially parallel with the pitch axis of the gimbal, and the second direction d2 may be substantially parallel with the roll axis of the gimbal. The first adjustment device 12c and the first fastener 12d may be provided on the first seating body 12a. The first adjustment device 12c may be configured to drive the first seating body 12a to move in the first direction d1. The first fastener 12d may be configured to lock the position of the first seating body 12a relative to the first horizontal frame 111, such that the first seating body 12a cannot move relative to the first horizontal frame 111. The second adjustment device 12e and the second fastener 21f may be provided on the second seating body 12b. The second adjustment device 12e may be configured to drive the second seating body 12b in the second direction d2. The second fastener 12f may be configured to lock the position of the second seating body 12b relative to the first body 12a, such that the second seating body 12b cannot move relative to the first seating body 12a.

In the embodiment shown in the drawings, the first seating body 12a may be sleeve-fit onto the first horizontal frame 111. In some embodiments, the first seating body 12a may include a first matching member 121 and a second matching member 122. The first matching member 121 and the second matching member 122 may be configured to couple together to form the first seating body 12a. The first matching member 121 may include a first groove 121a, and the second matching member 122 may include a second groove 122a. When the first matching member 121 and the second matching member 122 are coupled together, the first groove 121a and the second groove 122a form a through hole for the first horizontal frame 111 to penetrate through.

In some embodiments, the first matching member 121 may have a substantially "h" shape. The first matching member 121 may include a first mounting member 1211, a second mounting member 1212, and a connecting member 1213. The first mounting member 1211 and the second mounting member 1212 may be separated from one another and may be substantially parallel with one another. The connecting member 1213 may connect the first mounting member 1211 and the second mounting member 1212, and may be disposed between the first mounting member 1211 and the second mounting member 1212. In some embodiments, the length of the first mounting member 1211 may be greater than the length of the second mounting member 1212. The two ends of the connecting member 1213 may connect to the middle portion of the first mounting member 1211 and an end portion of the second mounting member 1212, respectively. An end portion of the first mounting member 1211, the connecting member 1213, and the second mounting member 1212 may form the first groove 121a. The first mounting member 1211 may extend in a direction facing against the first groove 121a.

In some embodiments, the first matching member 121 may include a first through hole 1214 for the first adjustment device 12c to penetrate through, and a first adapting groove 1215. The first through hole 1214 and the first adapting groove 1215 may be provided in the second mounting member 1212. The first through hole 1214 and the first adapting groove 1215 may be connected with one another. The first through hole 1214 may penetrate through a side surface of the second mounting member 1212 facing against the second matching member 122. The first adapting groove 1215 may penetrate through a side surface of the second mounting member 1212 facing the first mounting member 1211 and a side surface of the second mounting member 1212 facing the second matching member 122. The first through hole 1214 may be configured to allow the first adjustment device 12c to rotate relative to the first matching member 121. The first adapting groove 1215 may be a substantially cylindrical groove. The first adapting groove 1215 may have an opening on a surface of the second mounting member 1212 facing the first mounting member 1211. The opening may allow a portion of the first adjustment device 12c to protrude from the surface of the second mounting member 1212 facing the first mounting member 1211, such that the first adjustment device 12c may match with the guiding member 1111 and may drive the first seating body 12a to move in the first direction d1. In some embodiments, the first adapting groove 1215 may have other suitable shape, as long as the shape does not affect the first adjustment device 12c driving the first seating body 12a to move.

In some embodiments, the first matching member 121 may include a second through hole 1216 for the second adjustment device 12e to penetrate through, and a second adapting groove 1217. The second through hole 1216 and the second adapting groove 1217 may be provided in the first mounting member 1211. The second through hole 1216 and the second adapting groove 1217 may be connected with one another. The second through hole 1216 may penetrate through a side of the first mounting member 1211. In some embodiments, the second through hole 1216 may extend in a direction substantially perpendicular to a length direction of the guiding member 1111. The second adapting groove 1217 may penetrate through a first side surface of the first mounting member 1211 facing against the second mounting member 1212. The second adapting groove 1217 may penetrate through a second side surface of the first mounting member 1211 that is opposite the first side surface. In other words, the second adapting groove 1217 may penetrate through two opposite surfaces of the first mounting member 1211. The second through hole 1216 may allow the second adjustment device 12e to rotate relative to the first matching member 121. The second adapting groove 1217 may be a substantially rectangular groove. The second adapting groove 1217 may allow a portion of the second adjustment device 12e to protrude from the first side surface of the first mounting member 1211 facing against the second mounting member 1212, such that the second adjustment device 12e may match with the second seating body 12b and may drive the second seating body 12b to move in the second direction d2. In some embodiments, the second adapting groove 1217 may have other suitable shape, as long as the shape does not affect the second adjustment device 12e driving the second seating body 12b to move.

In some embodiments, the first matching member 121 may include a first assembly hole 1218 configured for mounting the second fastener 12f. In some embodiments, the first assembly hole 1218 may penetrate through a side surface of the first mounting member 1211 facing the second seating body 12b and a side surface of the first mounting member 1211 facing against the second seating body 12b. In other words, the first assembly hole 1218 may penetrate through two opposite surfaces of the first mounting member 1211. In some embodiments, the first assembly hole 1218 may include a first hole portion 1218a farther away from the second seating body 12b and a second hole portion 1218b closer to the second seating body 12b. The first hole portion 1218a and the second hole portion 1218b may be connected with one another. In some embodiments, the first hole portion 1218a may be a circular through hole. The second hole portion 1218b may be a non-circular column shaped hole. For example, the second hole portion 1218b may be a prism-column shaped hole, an oval-column shaped hole, or any other suitably shaped hole. An area of the cross section of the first hole portion 1218a may be smaller than an area of the cross section of the second hole portion 1218b.

In some embodiments, the first matching member 121 may include a mounting hole 1219 corresponding to the position limiting member 12g. The mounting hole 1219 may be configured for installing the position limiting member 12g. In some embodiments, the mounting hole 1219 may be a longitudinally extended hole. The mounting hole 1219 may be connected with the second through hole 1216 and the second adapting groove 1217. The mounting hole 1219 may penetrate through a side surface of the first mounting member 1211 facing the second seating body 12b.

In some embodiments, the second matching member 122 may have a substantially depressed shape, forming the second groove 122a. The second matching member 122 may include a second assembly hole 1221 configured for mounting the first fastener 12d. In some embodiments, the second assembly hole 1221 may penetrate through a side surface of the second matching member 122 facing the first matching member 121 and a side surface of the second matching member 122 facing against the first matching member 121. In other words, the second assembly hole 1221 may penetrate through two opposite surfaces of the second matching member 122. In some embodiments, the second assembly hole 1221 may be a threaded hole having internal threads.

In some embodiments, the second matching member 122 may include a receiving groove 122b. The receiving groove 122b may be configured to receive a portion of the first fastener 12d, and to allow the portion of the first fastener 12d to rotate relative to the second matching member 122. As shown in the drawings, the receiving groove 122b may have a depressed shape. In some embodiments, the receiving groove 122b may be formed by a depressed bottom surface of the second matching member 122 that forms the second groove 122a and a depressed side surface of the second matching member 122.

In some embodiments, the second seating body 12b may have a longitudinally extended shape. The second seating body 12b may include a mounting panel 123 and two side panels 124 connected with the mounting panel 123. The two side panels 124 may be substantially parallel with one another and may be substantially perpendicular to the mounting panel 123. The mounting panel 123 may include a top surface 1231 and a bottom surface 1232 opposite to the top surface 1231. The top surface 1231 of the mounting panel 123 may be configured for mounting the load 20. The bottom surface 1232 of the mounting panel 123 may include a rack 1233. The length direction of the rack 1233 may be substantially parallel with the length direction of the second seating body 12b. In some embodiments, the teeth of the rack 1233 may be disposed in a slant fashion (e.g., forming a predetermined angle) relative to the length direction of the rack 1233. The rack 1233 may be integrally formed with the second seating body 12b, or may be formed individually and fixedly connected with the second seating body 12b.

In some embodiments, the side panels 124 may protrude from the bottom surface 1232 and may be separated from one another at a predetermined distance. The two side panels 124 may include two guiding rails 1241 extending from the two side panels 124 toward one another. The guiding rails 1241 may be substantially parallel with the bottom surface 1232. The guiding rails 1241 may be configured to guide the moving direction of the second seating body 12b relative to the first seating body 12a. In other words, the guiding rails 1241 may guide the second seating body 12b to move in the second direction d2 relative to the first seating body 12a.

In some embodiments, the first adjustment device 12c may drive the first seating body 12a to move relative to the first horizontal frame 111 to adjust the mounting location of the first seating body 12a relative to the first horizontal frame 111. In some embodiments, the first adjustment device 12c may include a first knob 1251 and a first driving member 1252. The first knob 1251 may drive the first driving member 1252 to rotate. The first driving member 1252 may be fixedly connected with a rotating shaft 1253. Two ends of the rotating shaft 1253 may protrude from two sides of the first driving member 1252. The first knob 1251 may be sleeve-fit onto the rotating shaft 1253 and may form a rotation-stopping connection with the rotating shaft 1253. In some embodiments, at least a portion of the surface of the rotating shaft 1253 may be a polygon prism surface. The first knob 1251 may include a polygon insertion hole 1251a that matches with the polygon prism surface. In some embodiments, the rotation-stopping connection between the rotating shaft 1253 and the first knob 1251 may be formed using other suitable regular or non-regular matching shapes, such as an oval shape, a plum blossom shape, a dash shape, a crossing shape. In some embodiments, the rotation-stopping connection between the rotating shaft 1253 and the first knob 1251 may be realized using a rotation-stopping pin penetrating through the rotating shaft 1253 and the first knob 1251. In some embodiments, the first driving member 1252 may be a gear configured to engage with the rack 1114 provided on the first horizontal frame 111. In some embodiments, the first driving member 1252 may be a helical gear, i.e., the length direction of the teeth of the helical gear may form a predetermined angle with the rotating axis of the helical gear. The first driving member 1252 may engage with the slanted teeth of the rack 1122 through the helical gear structure, which may increase the area of engagement, reduce the matching gap, and increase the stability and reliability of the transmission.

In some embodiments, the first adjustment device 12c may include a bearing 1254. The bearing 1254 may include a shaft hole 1254a configured to rotatably match with the rotating shaft 1253. The first adjustment device 12c may be fixedly connected with the second matching member 122. The bearing 1254 may be fixedly connected with the second matching member 122 through any suitable ways of connection, such as through threaded connection, gluing, welding, or snap-fit.

In some embodiments, the bearing 1254 may be integrally formed with the second matching member 122. In some embodiments, the bearing 1254 may be omitted, and the shaft hole may be directly provided on the second matching member 122.

In some embodiments, the first fastener 12d may be configured to lock the first seating body 12a to the first horizontal frame 111 to fix the relative positions between the first seating body 12a and the first horizontal frame 111. The first fastener 12d may include a first abutting portion 1261, a first driving portion 1262, and a first handle 1263. The first abutting portion 1261 may be driven by the first driving portion 1262 to tightly abut against the first horizontal frame 111. The first handle 1263 may allow a user to operate the first driving portion 1262 to drive the first fastener 1261 to move. The first abutting portion 1261 may include a first end portion 1261a, a second end portion 1261b, and an abutting member 1261c located between the first end portion 1261a and the second end portion 1261b. The first end portion 1261a and the second end portion 1261b may each be connected with the abutting member 1261c in a slant fashion (e.g., forming a predetermined angle with the abutting member 1261c). The first end portion 1261a, the second end portion 1261b, and the abutting member 1261c may surroundingly form a matching groove 1261d. The inner surface of the matching groove 1261d and the side surface of the guiding member 1111 of the first horizontal frame 111 may match with one another. When the first abutting portion 1261 abuts tightly against the first horizontal frame 111, the inner surface of the matching groove 1261d may tightly abut against the side surface of guiding member 1111 to stably fix the first seating body 12a to the first horizontal frame 111.

In some embodiments, the first end portion 1261a may include a shaft hole 1261e. The first abutting portion 1261 may be rotatably connected with the first seating body 12a through the rotating shaft 1261f. In some embodiments, the first abutting portion 1261 may be rotatably disposed in the receiving groove 122b, and may rotate under the driving force of the first driving portion 1262 to partially extend out of the receiving groove 122b. In some embodiments, the second matching member 122 may include an insertion hole 1222 configured for the rotating shaft 1261f to penetrate through.

In some embodiments, the first driving portion 1262 may include a stud section 1262a, a connecting section 1262b, and positioning member 1262c located between the stud section 1262a and the connecting section 1262b. The stud section 1262a may include external threads matching with the internal threads of the second assembly hole 1221. The length of the stud section 1262a may be greater than the depth of the second assembly hole 1221, such that an end portion of the stud section 1262a may drive the first abutting portion 1261 to move. The connecting section 1262b may form a rotation-stopping connection with the first handle 1263. Detailed method of forming the rotation-stopping connection may refer to the above descriptions of the rotation-stopping connection included in the first adjustment device 12c.

In some embodiments, the positioning member 1262c may protrude from a circumferential side surface of the stud section 1262a, to form a substantially ring-shaped flange. The size of the positioning member 1262c may be greater than the size of the cross sectional area of the second assembly hole 1221. When the stud section 1262a is inserted into the second assembly hole 1221 for a predetermined length, the positioning member 1262c may abut against the first seating body 12a, to avoid harm caused by overly tight abutting of the first abutting portion 1261 against the first horizontal frame 111. In the meantime, the presence of the positioning member 1262c may provide a straightforward visual reminder to the operator as to whether the locking is sufficient.

In some embodiments, the first handle 1263 may form a rotation-stopping connection with the connecting section 1262b. The first handle 1263 may be operated by the operator to cause the first driving portion 1262 to rotate and drive the first abutting portion 1261 to move. The first handle 1263 may include a handle member 1263a that may extend substantially perpendicular to an axis of the first handle 1263. The handle member 1263a may save labour when the operator operates the first handle 1263.

In some embodiments, the first driving portion 1262 may drive the first abutting portion 1261 using matching threads. In some embodiments, the first driving portion 1262 may drive the first abutting portion 1261 using other suitable structures or methods, such as a linear push-and-pull structure or method, a lever-transmission structure or method, etc.

In some embodiments, the second adjustment device 12e may be configured to drive the second seating body 12b to move relative to the first seating body 12a, thereby adjusting the mounting position of the second seating body 12b relative to the first seating body 12a. The second adjustment device 12e may include a second knob 1271 and a second driving member 1272. The second knob 1271 may drive the second driving member 1272 to rotate. The second knob 1271 may be fixedly connected with a rotating shaft 1273. The second driving member 1272 may sleeve-fit onto the rotating shaft 1273 and may form a rotation-stopping connection with the rotating shaft 1273. In some embodiments, at least a portion of the surface of the rotating shaft 1273 is a polygon prism surface. The second driving portion 1272 may include a polygon through hole 1272a matching with the polygon prism surface. In some embodiments, the rotating shaft 1273 and the second driving member 1272 may form the rotation-stopping connection through other suitable regular or non-regular matching shapes, such as an oval shape, a plum blossom shape, a dash shape, a crossing shape. In some embodiments, the rotation-stopping connection between the rotating shaft 1273 and the second driving member 1272 may be realized using a rotation-stopping pin penetrating through the rotating shaft 1273 and the second driving member 1272. In some embodiments, the second driving member 1272 may be a gear configured to engage with the rack 1233 of the second seating body 12b. In some embodiments, the second driving member 1272 may be a helical gear, i.e., the length direction of the teeth of the helical gear may form a predetermined angle with the rotating axis of the helical gear. The second driving member 1272 may engage with the slanted teeth of the rack 1233 through the helical gear structure, which may increase the area of engagement, reduce the matching gap, and increase the stability and reliability of the transmission.

In some embodiments, the second fastener 12f may be configured to lock the second seating body 12b to the first seating body 12a. In the embodiments shown in the drawings, the second fastener 12f may include a second abutting portion 1281, a second driving portion 1282, and a second handle 1283. The second abutting portion 1281 may be configured to be driven by the second driving portion 1282 to tightly abut against the second seating body 12b. The second handle 1283 allows an operator to operate the second driving portion 1282 to drive the second abutting portion 1281 to move. The second abutting portion 1281 may include a pressing panel 1281a and a connecting column 1281b connected with the pressing panel 1281a. The size of the pressing panel 1281a may be greater than the size of the cross section area of the connecting column 1281b, such that the circumference of the pressing panel protrudes from a side surface of the connecting column 1281b. The protruding circumference of the pressing panel 1281a may slidably snap in the second seating body 12b. In some embodiments, the pressing panel 1281a may hang onto the guiding rails

1241 of the second seating body 12b, and may slide along the guiding rails 1241. The connecting column 1281b may be non-cylindrical prism, and may connect and match with the first assembly hole 1218. The connecting column 1281b may be slidable along the first assembly hole 1218. Due to the non-circular matching shapes, the connecting column 1281b may not rotate relative to the first seating body 12a. An end surface of the connecting column 1281b facing against the pressing panel 1281a may include a connecting hole 1281c. In some embodiments, the connecting hole 1281c may be a threaded hole.

In some embodiments, the second driving portion 1282 may be a bolt, including the stud 1282a and a nut 1282b connected with an end of the stud 1282a. The stud 1282a may include external threads matching with the connecting hole 1281c. The size of the nut 1282b may be greater than the size of the cross sectional area of the first hole portion 1218a. In some embodiments, the nut 1282b may be a substantially circular nut. The circumference of the nut 1282b may include a protruding rib 1282c. In some embodiments, the protruding rib 1282c may include a plurality of strip-shaped protruding ribs. The length direction of the protruding rib 1282c may be substantially parallel with the central axis of the nut 1282b.

In some embodiments, the second handle 1283 may be provided at an end of the second driving portion 1282 and may form a rotation-stopping connection with the second driving portion 1282. In some embodiments, the second handle 1283 may include a sleeve fitting member 1283a and a handle member 1283b connected with the sleeve fitting member 1283a. The sleeve fitting member 1283a may have a substantially ring shape. An inner surface of the sleeve fitting member 1283a may include a groove 1283c matching the protruding rib 1282c. When the sleeve fitting member 1283a is positioned on the nut 1282b, the groove 1283c may match with the protruding rib 1282c such that the second handle 1283 and the second driving portion 1282 may form a rotation-stopping connection. In some embodiments, the rotation-stopping connection between the sleeve fitting member 1283a and the nut 1282b may be formed using other suitable regular or non-regular matching shapes, such as an oval shape, a plum blossom shape, a dash shape, a crossing shape. In some embodiments, the rotation-stopping connection between the sleeve fitting member 1283a and the nut 1282b may be formed using a rotation-stopping pin penetrating through the sleeve fitting member 1283a and the nut 1282b. In some embodiments, the second handle 1283 may be integrally formed with the second driving portion 1282.

In some embodiments, the handle member 1283b may extend to a side of the sleeve fitting member 1283a for a predetermined distance, such that labour can be saved for the operator when the operator operates the second handle 1283.

In some embodiments, the second driving portion 1282 may lock the second seating body 12b using matching threads. In some embodiments, the second driving portion 1282 may lock the second seating body 12b using other suitable structures or methods, such as a linear push-and-pull structure or method, a lever-transmission structure or method, etc.

In some embodiments, the second fastener 12f may include a cover 1284. The cover 1284 may be configured to restrain the handle member 1283b from falling off from the second driving portion 1282. The cover 1284 may have an inwardly depressed disk shape. A side of the cover 1284 may include an opening 1284a. The opening 1284a may allow the handle member 1283b to extend out of the cover 1284. The opening 1284a may have a specified length to allow the handle member 1283b to swing in a predetermined range of angles.

In some embodiments, the position limiting member 12g may be configured to snap fit with the second seating body 12b, thereby restraining the size of the matching gap between the second seating body 12b and the first seating body 12a (so the matching gaps is not too large or not larger than a predetermined size). As a result, the adjustment and the locking position of the second seating body 12b may be more accurate. In some embodiments, the position limiting member 12g may include a fixed part 1291 and a snap-fit part 1292. The fixed part 1291 may be connected with the snap-fit part 1292 to form a substantially "L" shape. The snap-fit part 1292 may snap in between the guiding rails 1241 of the second seating body 12b and the mounting panel 123. The thickness of the snap-fit part 1292 may be slightly smaller than the gap between the guiding rails 1241 and the mounting panel 123, such that the snap-fit part 1292 may snap in between the guiding rails 1241 of the second seating body 12b and the mounting panel 123, and the gap between the guiding rails 1241 and the mounting penal 123 is maintained small. The fixed part 1291 may include a through hole 1291a configured to allow the first rotating shaft 1273 to penetrate through.

Next, the assembly relationship of the imaging device 100 will be explained with reference to FIG. 1 to FIG. 4.

As shown in the drawings, the first adjustment device 12c, the first fastener 12d, the second adjustment device 12e, the second fastener 12f, and the position limiting member 12g may be mounted on the first seating body 12a. In some embodiments, an end of the rotating shaft 1253 may penetrate through the first through hole 1214. The bearing 1254 may be fixed to the second matching member 122. The first driving member 1252 may be positioned in the first adapting groove 1215, and a portion of the first driving member 1252 may protrude from a surface of the second mounting member 1212 facing the first mounting member 1211. The first knob 1251 may be connected with an end of the rotating shaft 1253 penetrating the first through hole 1214. A rotation-stopping connection may be formed between the first knob 1251 and the rotating shaft 1253.

In some embodiments, the first abutting portion 1261 may be provided in the receiving groove 122b. The rotating shaft 1253 may penetrate the insertion hole 1222 and the shaft hole 1261e to rotatably connect the first abutting portion 1261 with the second matching member 122. The stud section 1262a of the first driving portion 1262 may engage with the threads of the second assembly hole 1221 and may be inserted into the second assembly hole 1221. The first handle 1263 may be connected with the connecting section 1262b through a rotation-stopping connection.

In some embodiments, the position limiting member 12g may be inserted into and fixed in the mounting hole 1219. The second driving member 1272 may be disposed in the second adapting groove 1217 and may partially protrude from the second adapting groove 1217. The rotating shaft 1273 may penetrate through the second through hole 1216, the through hole 1273a of the second driving member 1272, and the through hole 1291a of the position limiting member 12g, and may be rotatably connected with the first matching member 121.

In some embodiments, the connecting column 1281b of the second abutting portion 1281 may be inserted into the second hole portion 1218b. The second driving portion 1282 may penetrate through the first hole portion 1218a to connect with the connecting column 1281b through threads. The sleeve fitting member 1283a of the second handle 1283 may sleeve fit onto the nut 1282b and may form a rotation-stopping connection with the second driving portion 1282. The cover 1284 may cover the second driving portion 1282 and a portion of the second handle 1283 that is fixedly connected with the first matching member 121.

In some embodiments, the first matching member 121 and the second matching member 122 are joined with one another at two sides of the first horizontal frame 111. After being joined, the first matching member 121 and the second matching member 122 may sleeve fit with the first horizontal frame 111. An end of the rotating shaft 1253 that faces the second matching member 122 may rotatably penetrate through the shaft hole 1254a of the bearing 1254. The first driving member 1252 may be engaged with the rack of the guiding member 1111. The first matching member 121 and the second matching member 122 may be joined with one another using a bolt, a gluing member, or a snap-fitting member.

In some embodiments, the second seating body 12b may be disposed on the first seating body 12a. The circumference of the pressing panel 1281a of the second fastener 12f and the snap-fit part 1292 of the position limiting member 12g may snap in between the guiding rails 1241 of the second seating body 12b and the mounting panel 123. The second driving member 1272 and the rack 1233 of the second seating body 12b may engage with one another.

In some embodiments, the load 20 may be fixedly mounted to the second seating body 12b.

In some embodiments, before the imaging device 100 is used, the position of the load 20 may be adjusted in the first direction d1 through the first adjustment device 12c, and in the second direction d2 through the second adjustment device 12e, such that the center of gravity of the load 20 falls on an axis of rotation of the gimbal. This may avoid unexpected torque applied to the electric motor of the gimbal, thereby ensuring the operation life of the gimbal and improving the photographing user experience. After the load 20 is adjusted in the first direction d1, an operator may operate the first fastener 12d to cause the first abutting portion 1261 to closely abut against a side surface of the guiding member 1111, thereby fixing the relative position of the first seating body 12a relative to the first horizontal frame 111. After the load is adjusted in the second direction d2, the operator may operate the second fastener 12f to cause the second abutting portion 1281 to tightly abut against the guiding rails 1241, thereby fixing the relative position of the second seating body 12b relative to the first seating body 12a. As such, it becomes convenient to adjust the center of gravity of the imaging device 100 and to lock the position of the load 20.

In some embodiments, the first adjustment device 12c may be provided on the first seating body 12a, and may be configured to engage with the rack 1114 provided on the first horizontal frame 111 to drive the first seating body 12a to move. In some embodiments, the first adjustment device 12c may be provided on the first horizontal frame 111, and the rack 1114 may be provided on the first seating body 12a. Similarly, in some embodiments, the second adjustment device 12e may be provided on the second seating body 12b, and the rack 1233 may be provided on the first seating body 12a.

A person having ordinary skill in the art can appreciate that for convenience and simplicity, the above descriptions described the division of the functioning units. In practical applications, the disclosed functions may be realized by various functioning units. For example, in some embodiments, the internal structure of a device may be divided into different functioning units to realize all or part of the above-described functions. The detailed operations and principles of the device are similar to those described above, which are not repeated.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A gimbal load mounting assembly, comprising:
   a first seating body;
   a second seating body configured to slidably connect with the first seating body;
   a fastener provided on the first seating body and configured to abut the second seating body against the first seating body and lock the second seating body to the first seating body; and
   an adjustment device,
   wherein the first seating body is configured to connect with a supporting frame of a gimbal and is slidable in a first direction,
   wherein the second seating body is configured to mount a load, and is slidable along the first seating body in a second direction, and
   wherein the adjustment device is provided on one of the first seating body and the second seating body, and is configured to drive the other one of the first seating body and the second seating body to move to adjust relative positions between the first seating body and the second seating body.

2. The gimbal load mounting assembly of claim 1, wherein the adjustment device is rotatably disposed on the first seating body and is configured to drive the second seating body to move.

3. The gimbal load mounting assembly of claim 2, wherein the adjustment device comprises a knob and a driving member, and
   wherein the knob is configured to connect with the driving member through a rotation-stopping connection, and to drive the driving member to rotate to thereby driving the second seating body to move.

4. The gimbal load mounting assembly of claim 3, wherein the knob is configured to fixedly connect with a rotating shaft, and
   wherein the driving member is configured to sleeve-fit onto the rotating shaft and form a rotation-stopping connection with the rotating shaft.

5. The gimbal load mounting assembly of claim 4, wherein the first seating body comprises a through hole and an adapting groove,
   wherein the driving member is disposed at the adapting groove and a portion of the driving member is configured to protrude out of the adapting groove,
   wherein the rotating shaft is configured to penetrate the through hole to rotatably connect the driving member and the first seating body, and
   wherein the portion of the driving member configured to protrude out of the adapting groove is configured to drive the second seating body to move.

6. The gimbal load mounting assembly of claim 3, wherein the driving member comprises a gear, wherein the second seating body comprises a rack configured to engage with the gear, and wherein the driving member is configured to drive the second seating body to move through the engagement of the gear and the rack.

7. The gimbal load mounting assembly of claim 1,
wherein the fastener comprises an abutting portion and a driving portion, and
wherein the abutting portion is configured to abut against the second seating body when driven by the driving portion.

8. The gimbal load mounting assembly of claim 7,
wherein the abutting portion comprises a pressing panel and a connecting column connected with the pressing panel,
wherein the connecting column is configured to connect to the driving portion, and
wherein the pressing panel is configured to slidably snap into the second seating body.

9. The gimbal load mounting assembly of claim 8, wherein
the driving portion is configured to connect with the connecting column through threads, and to rotate to cause the abutting portion to move linearly to abut against or release the second seating body.

10. The gimbal load mounting assembly of claim 8, wherein
a circumference of the pressing panel is configured to protrude from a side surface of the connecting column, and to slidably snap in the second seating body.

11. The gimbal load mounting assembly of claim 10,
wherein the second seating body comprises a mounting panel and two side panels configured to connect with the mounting panel, the two side panels being disposed opposite to one another,
wherein the two side panels comprise two guiding rails extending from the two side panels toward one another, and
wherein the circumference of the pressing panel is configured to snap in between the guiding rails and the mounting panel.

12. The gimbal load mounting assembly of claim 8,
wherein the first seating body comprises an assembly hole,
wherein the connecting column is configured to slidably position in the assembly hole, and
wherein the driving portion is configured to penetrate through the assembly hole to connect with the connecting column and is configured to drive the connecting column to slide along the assembly hole.

13. The gimbal load mounting assembly of claim 7, wherein
the fastener comprises a handle,
the handle is configured to connect with the driving portion through a rotation-stopping connection, and to cause the driving portion to rotate to drive the abutting portion.

14. The gimbal load mounting assembly of claim 13,
wherein the handle comprises a sleeve fitting member and a handle member configured to connect with the sleeve fitting member,
wherein the sleeve fitting member is configured to sleeve-fit onto the driving portion and to connect with the driving portion through the rotation-stopping connection, and wherein the handle member is configured to extend toward a side of the sleeve fitting member for a predetermined distance.

15. The gimbal load mounting assembly of claim 13,
wherein the fastener comprises a cover configured to cover the driving portion and a portion of the handle, and is fixedly connected with the first seating body to restrain the handle from falling off from the driving portion.

16. A gimbal, comprising:
a supporting frame;
a motor assembly configured to drive the supporting frame to rotate; and
a gimbal load mounting assembly mounted to the supporting frame, the gimbal load mounting assembly comprising:
a first seating body;
a second seating body configured to slidably connect with the first seating body;
a fastener provided on the first seating body and configured to abut the second seating body against the first seating body and lock the second seating body to the first seating body; and
an adjustment device,
wherein the first seating body is configured to connect with the supporting frame and is slidable in a first direction,
wherein the second seating body is configured to mount a load, and is slidable along the first seating body in a second direction, and
wherein the adjustment device is provided on one of the first seating body and the second seating body, and is configured to drive the other one of the first seating body and the second seating body to move to adjust relative positions between the first seating body and the second seating body.

17. The gimbal of claim 16, further comprising:
a position limiting member disposed on the first seating body and configured to slidably snap-fit with the second seating body.

18. The gimbal of claim 17,
wherein the position limiting member comprises a fixed part and a snap-fit part,
wherein the fixed part is configured to fixedly connect with the first seating body, and
wherein the snap-fit part is configured to slidably snap-fit with the second seating body.

19. An imaging device, comprising:
a gimbal; and
a photographing assembly mounted to the gimbal,
wherein the gimbal comprises:
a supporting frame; and
a gimbal load mounting assembly comprising:
a first seating body;
a second seating body configured to slidably connect with the first seating body;
a fastener provided on the first seating body and configured to abut the second seating body against the first seating body and lock the second seating body to the first seating body; and
an adjustment device,
wherein the first seating body is configured to connect with the supporting frame and is slidable in a first direction,
wherein the second seating body is configured to mount the photographing assembly, and is slidable along the first seating body in a second direction, and wherein the adjustment device is provided on one of the first seating body and the second seating body, and is configured to drive the other one of the first seating body and the second seating body to move to adjust relative positions between the first seating body and the second seating body.

* * * * *